(12) United States Patent
Ishikawa et al.

(10) Patent No.: US 7,381,485 B2
(45) Date of Patent: Jun. 3, 2008

(54) MAGNETIC RECORDING TAPE

(75) Inventors: Tatsuo Ishikawa, Kanagawa (JP);
Mikio Ohno, Kanagawa (JP);
Tomohiro Ichikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 493 days.

(21) Appl. No.: 11/049,891

(22) Filed: Feb. 4, 2005

(65) Prior Publication Data
US 2005/0202289 A1  Sep. 15, 2005

(30) Foreign Application Priority Data
Feb. 5, 2004 (JP) ............... P. 2004-028926

(51) Int. Cl.
*B32B 5/04* (2006.01)
*B32B 5/716* (2006.01)

(52) U.S. Cl. ............... 428/847.2; 428/847.3; 428/848.2; 428/482

(58) Field of Classification Search ............ 428/831.2, 428/838, 840.1, 847.2, 847.3, 847.4, 848.2, 428/848.8, 482, 480; 83/13; 360/134
See application file for complete search history.

(56) References Cited

U.S. PATENT DOCUMENTS 6,713,155 B1* 3/2004 Handa et al. ............ 428/847.4

2003/0124385 A1* 7/2003 Ishikawa et al. ............ 428/487
2003/0148131 A1* 8/2003 Tsunekawa et al. ......... 428/482
2003/0188612 A1* 10/2003 Kobayashi et al. ............ 83/13
2004/0173069 A1* 9/2004 Shoudai et al. ................ 83/13

FOREIGN PATENT DOCUMENTS

JP  7-6351 A  1/1995
JP  8-45060 A  2/1996

OTHER PUBLICATIONS

Translation JA 08-045060.*
Translation JA 07-006351.*
Abstract JA 08-045060.*
Abstract JA 07-006351.*

* cited by examiner

*Primary Examiner*—Carol Chaney
*Assistant Examiner*—Louis Falasco
(74) *Attorney, Agent, or Firm*—Sughrue Mion, PLLC

(57) ABSTRACT

A magnetic recording tape comprising a nonmagnetic support and a magnetic layer containing ferromagnetic powder and a binder, wherein the nonmagnetic support has an intrinsic viscosity of from 0.40 to 0.60 dl/g and a number average molecular weight of from 12,000 to 24,000, and a distance between an apex of a maximum convexity and a valley of a maximum concavity of the nonmagnetic support on a cross section of an edge of the tape made by cutting the tape in a transverse direction is 2 μm or less in the transverse direction.

15 Claims, 1 Drawing Sheet

MAGNETIC RECORDING TAPE

FIELD OF THE INVENTION

The present invention relates to a magnetic recording medium excellent in durability and electromagnetic characteristics.

BACKGROUND OF THE INVENTION

In the field of magnetic recording, realization of digital recording that is little in the deterioration of records is progressing superseding conventional analog recording. In addition to higher image quality and sound quality, miniaturization and saving of space are also required of the recording and reproducing apparatus used for digital recording and the magnetic recording medium. In general, much signal recording is required in digital recording as compared with analog recording, so that further higher recording density is required of the magnetic recording medium for digital recording.

An MR head that works with MR (magneto-resistance) as the principle of operation have got to be used in recent years. Several times of reproduction output can be obtained with the MR head as compared with the induction type magnetic head. Further, noises generated from instruments, e.g., impedance noises, are greatly reduced, therefore, it becomes possible to realize good recording and reproduction by lowering the noises coming from magnetic recording media themselves, and high density recording characteristics can be drastically improved. For this purpose, further fining of ferromagnetic powder particles and smoothing of the magnetic layer surface are required of the magnetic recording media for suppressing the noises of the media themselves.

For achieving high density recording, further shortening of the wavelengths of recording signals and narrowing of the recording track are necessary, so that further fining of ferromagnetic powder particles, increasing of packing density and smoothing of the magnetic layer surface are also required from these points of view. Further, in a magnetic tape, thinning of a magnetic recording medium is also required for increasing the volume density.

A magnetic recording medium has generally a constitution comprising a nonmagnetic support having provided thereon a magnetic layer, or a nonmagnetic support having thereon a nonmagnetic layer and a magnetic layer on the nonmagnetic layer.

For the thinning of a magnetic recording medium with the increase of recording density, not only a magnetic layer but also a nonmagnetic support and a nonmagnetic layer are required to be thin. However, mere thinning is accompanied by the reduction of running durability due to thinning of a nonmagnetic support, the surface state of the nonmagnetic support greatly influences the magnetic layer due to thinning of the magnetic layer and the nonmagnetic layer, and the surface smoothness of the magnetic layer is disturbed, e.g., spines occur by reflecting the surface state of the nonmagnetic support, which results in the reduction of output, and the generation of dropout and noise. In particular, in a magnetic tape for use in a linear recording system, a tape runs almost in parallel to a head to touch the head, so that the dropout is liable to occur due to the spines on the surface of the magnetic layer.

On the other hand, for obtaining the smoothness of the surface of a magnetic layer, it is an effective means to smooth the surface of a nonmagnetic support, and further fining of additives, such as fillers, to be added to a nonmagnetic support and further reduction of the addition amounts are effective for that purpose. However, the strength of the nonmagnetic support lowers by changing the filler size and addition amount, and durability, particularly the durability of the tape edge, is deteriorated. Further, in the case of a magnetic tape, if unevenness remains on a tape edge (in particular, the edge of a support part) by cutting in a slit process, the convex part is shaved by running system in the drive and shavings accumulate on a head, which results in the reduction of SN ratio. Further, the convex part also becomes an obstacle in winding up of a tape. The unevenness of a tape edge occurs when the strength of a support is too high and the support is cut as if it is torn, so that it is necessary to correct the strength of a support.

Accordingly, in advancing the increment of recording density of a magnetic recording medium, the compatibility of the improvement of electromagnetic characteristics by surface smoothness and durability is desired.

A magnetic recording medium is so far proposed in which the strength of the nonmagnetic support is ensured by correcting the molecular weight and the viscosity of the polyethylene naphthalate used as the nonmagnetic support and the Young's modulus of the nonmagnetic support, and particularly the assurance of running durability is contrived by preventing the protuberance of the tape edge (refer to, e.g., JP-A-7-6351 (The term "JP-A" as used herein refers to an "unexamined published Japanese patent application".) and JP-A-8-45060).

SUMMARY OF THE INVENTION

Although there are disclosed in JP-A-7-6351 and JP-A-8-45060 on the assurance of the strength of a nonmagnetic support as described above, in particular on the prevention of the protuberance of tape edge, there is no disclosure at all on the specific configuration of edge. Further, the surface properties of a magnetic recording medium are not disclosed at all. The surface properties of a magnetic recording medium are important for obtaining good electromagnetic characteristics and running durability, therefore, the prescriptions in each of JP-A-7-6351 and JP-A-8-45060 alone are not sufficient as the support of the latest magnetic recording medium improved in recording density.

In view of these circumstances, an object of the present invention is to provide a magnetic recording medium excellent in durability, in particular the durability of edge, and electromagnetic characteristics.

The above object of the invention can be solved by the following means.

(1) A magnetic recording medium in the form of a tape comprising a nonmagnetic support having provided thereon a magnetic layer containing ferromagnetic powder and a binder, wherein the intrinsic viscosity of the nonmagnetic support is from 0.40 to 0.60 dl/g, the number average molecular weight is from 12,000 to 24,000, and the difference (distance) between the apex of the maximum convexity and the valley of the maximum concavity of the nonmagnetic support on the cross section of the tape edge in the transverse direction is 2 µm or less.

(2) The magnetic recording medium as described in the above item (1), wherein the nonmagnetic support is a laminated polyester film comprising at least two layers, the stylus type, three-dimensional mean surface roughness (the tracer system three-dimensional surface roughness) (SRa) of the nonmagnetic support surface on the side having a magnetic layer (side A) is from 1 to 6 nm, the stylus type, three-dimensional mean surface roughness (SRa) on the side opposite to side A (side B) is from 6 to 10 nm, and SRa (A)<SRa (B).

(3) The magnetic recording medium as described in the above item (1) or (2), wherein a nonmagnetic layer containing nonmagnetic powder and a binder is provided between the nonmagnetic support and the magnetic layer.

(4) The magnetic recording medium as described in any of the above items (1) to (3), wherein a back coat layer is provided on the side of the nonmagnetic support opposite to the side on which a magnetic layer is provided.

According to the invention, a magnetic recording medium in the form of a tape having high tape edge strength, reduced in shaving of edge during running due to little protuberance of the support, and exhibiting excellent electromagnetic characteristics and good running durability, particularly edge durability, can be provided. Further, the surface roughness of the support on the side having a magnetic layer is small, so that a magnetic recording medium having a high SN ratio, excellent electromagnetic characteristics and good running durability can be obtained.

DESCRIPTION OF REFERENCE NUMERALS AND SIGNS

Figure 1:
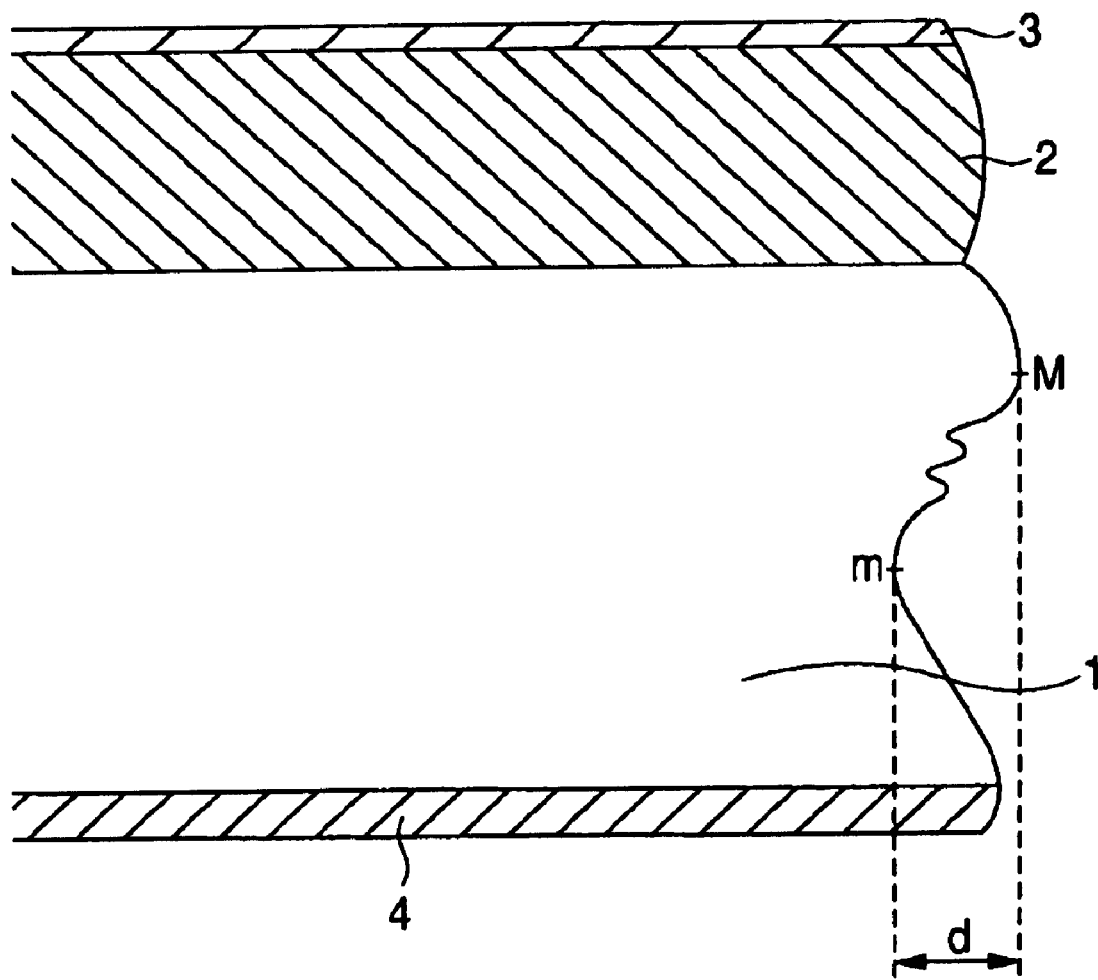
FIG. 1 is a cross sectional view typically showing the cross section of a tape edge when a tape is cut in the transverse direction.

1: Nonmagnetic support
2: Nonmagnetic layer
3: Magnetic layer
4: Back coat layer
M: Apex of the maximum convexity of the tape edge
m: Valley of the maximum concavity of the tape edge
d: Difference in convexity and concavity

DETAILED DESCRIPTION OF THE INVENTION

The magnetic recording medium in the invention comprises a nonmagnetic support having a magnetic layer thereon, and has excellent electromagnetic characteristics and durability suitable for high density recording by correcting the physical characteristics, i.e., the intrinsic viscosity and the molecular weight, of the polyester used as the nonmagnetic support and the configuration of the nonmagnetic support on the tape edge.

As the configuration of the tape edge of the magnetic recording medium in the invention, the difference (distance) between the apex of the maximum convexity and the valley of the maximum concavity in the transverse direction (hereinafter also referred to as the difference between concavity and convexity) of the nonmagnetic support on the cross section of the tape edge is 2 µm or less. The cross section of the tape edge means the cross section when a tape is cut in the transverse direction. A typical cross-sectional view of a tape edge in the case where a tape is cut in the transverse direction is shown in FIG. 1. As shown in FIG. 1, unevenness is formed on the cross section of the tape edge due to tearing at the time of slitting of the tape. The difference between concavity and convexity is difference d between the apex M of the maximum convexity and the valley m of the maximum concavity. The difference d between concavity and convexity can be obtained by observing the cross section of a tape cut in the transverse direction with an electron microscope or the like. The edge shaving of a tape in tape running can be reduced and edge durability can be improved by making the difference between concavity and convexity 2 µm or less. As a result, dirtying of a head due to edge shaving can be prevented, SNR rises and the reduction of electromagnetic characteristics can be prevented. From these points of view, the difference between concavity and convexity is preferably 1.5 µm or less, more preferably 1.0 µm or less.

For making the difference between concavity and convexity 2 µm or less, it is effective to correct the strength of a nonmagnetic support by adjusting the intrinsic viscosity and molecular weight of a nonmagnetic support, and to better the tearing property of a nonmagnetic support at the time of slitting by adjusting the thickness of a tape (each thickness of a nonmagnetic support, a magnetic layer, a nonmagnetic layer and a backing layer), and adjusting the slitting conditions (shear rate and the degree of abrasion of slitting blades).

The intrinsic viscosity of a nonmagnetic support in the invention is from 0.40 to 0.60 dl/g and the number average molecular weight is from 12,000 to 24,000. When the intrinsic viscosity and the number average molecular weight are in these ranges, a magnetic recording medium having good tearing property of a support and little in the difference between concavity and convexity on the cross section of edge can be obtained. When the intrinsic viscosity is less than 0.40 dl/g or the number average molecular weight is less than 12,000, the degree of polymerization is low, so that the strength of the support does not increase and durability, in particular the durability of edge, lowers and the film-forming property is also inferior. While when the intrinsic viscosity exceeds 0.60 dl/g or the number average molecular weight is higher than 24,000, the tearing property in a slitting process deteriorates. From this point of view, the intrinsic viscosity is more preferably from 0.45 to 0.55 dl/g, and the number average molecular weight is more preferably from 14,000 to 20,000, and particularly preferably from 14,000 to 16,000.

In the invention, intrinsic viscosity means a value obtained by dissolving polyester in a mixed solvent comprising phenol/1,1,2,2-tetrachloroethane (60/40 by mass (weight)), measuring the relative viscosities of the solution corresponding to the concentration of the polyester at several points at 25° C. with an automatic viscometer mounting Ubbelohde's viscometer, plotting the obtained measured data and extrapolating the point of zero of concentration. The number average molecular weight means a number average molecular weight obtained by dissolving polyester in hexafluoroisopropanol and analyzing by GPC (gel permeation chromatography) calculated in terms of polymethyl methacrylate (PMMA).

The constitution and the like of each layer of the magnetic recording medium in the invention are described in detail below.

Nonmagnetic Support:

Polyesters for use in the invention as the nonmagnetic supports are preferably polyesters comprising dicarboxylic acid and diol, e.g., polyethylene naphthalate and polyethylene terephthalate.

As the dicarboxylic acid components of polyesters, terephthalic acid, isophthalic acid, phthalic acid, 2,6-naphthalenedicarboxylic acid, 2,7-naphthalenedicarboxylic acid, diphenyl sulfone dicarboxylic acid, diphenyl ether dicarboxylic acid, diphenylethanedicarboxylic acid, cyclohexanedicarboxylic acid, diphenyldicarboxylic acid, diphenyl thioether dicarboxylic acid, diphenyl ketone dicarboxylic acid, and phenylindanedicarboxylic acid can be exemplified.

As the diol components, ethylene glycol, propylene glycol, tetramethylene glycol, cyclohexanedimethanol, 2,2-bis (4-hydroxyphenyl)propane, 2,2-bis(4-hydroxyethoxy-phenyl)propane, bis(4-hydroxyphenyl)sulfone, bisphenol fluorene dihydroxy ethyl ether, diethylene glycol, neopentyl glycol, hydroquinone, and cyclohexanediol can be exemplified.

Of polyesters comprising these dicarboxylic acids and diols as main constitutional components, from the points of transparency, mechanical strength and dimensional stability, polyesters mainly comprising terephthalic acid and/or 2,6-naphthalenedicarboxylic acid as the dicarboxylic acid components, and ethylene glycol and/or 1,4-cyclohexanedimethanol as the diol components are preferred. Of these polyesters, polyesters mainly comprising polyethylene terephthalate or polyethylene-2,6-naphthalate, polyesters copolymers comprising terephthalic acid, 2,6-naphthalenedicarboxylic acid and ethylene glycol, and polyesters mainly comprising mixtures of two or more of these polyesters are preferred. Polyesters mainly comprising polyethylene-2,6-naphthalate are particularly preferred.

Polyesters constituting the polyester films in the invention may be copolymerized with other copolymer components or mixed with other polyesters so long as they do not hinder the effect of the invention. As the examples thereof, the aforementioned dicarboxylic acid components, diol components, and polyesters comprising these components are exemplified.

For the purpose of hardly causing delamination when formed as a film, polyesters for use in the invention may be copolymerized with aromatic dicarboxylic acids having a sulfonate group or ester formable derivatives of them, dicarboxylic acids having a polyoxyalkylene group or ester formable derivatives of them, or diols having a polyoxyalkylene group. Of these compounds, from the points of polymerization reactivity of polyesters and transparency of films, sodium 5-sulfoisophthalate, sodium 2-sulfoterephthalate, sodium 4-sulfophthalate, sodium 4-sulfo-2,6-naphthalene-dicarboxylate, compounds obtained by substituting the sodium of the above compounds with other metals (e.g., potassium, lithium, etc.), ammonium salt or phosphonium salt, or ester formable derivatives of them, polyethylene glycol, polytetramethylene glycol, polyethylene glycol-polypropylene glycol copolymers, and compounds obtained by oxidizing both terminal hydroxyl groups of these compounds to make carboxyl groups are preferably used. The proportion of the copolymerization of these compounds for this purpose is preferably from 0.1 to 10 mol % on the basis of the amount of the dicarboxylic acids constituting the polyesters.

For improving heat resistance, bisphenol compounds, and compounds having a naphthalene ring or a cyclohexane ring can be copolymerized with polyesters. The proportion of the copolymerization of these compounds is preferably from 1 to 20 mol % on the basis of the amount of the dicarboxylic acids constituting the polyesters.

The synthesizing method of polyesters is not especially restricted in the invention, and well-known manufacturing methods of polyesters can be used. For example, a direct esterification method of directly esterification reacting dicarboxylic acid component and diol component, and an ester exchange method of performing ester exchange reaction of dialkyl ester as the dicarboxylic acid component and diol component in the first place, which is then polymerized by heating under reduced pressure to remove the excessive diol component can be used. At this time, if necessary, an ester exchange catalyst, a polymerization reaction catalyst or a heat resistive stabilizer can be added.

Further, one or two or more kinds of various additives, such as a coloring inhibitor, an antioxidant, a crystal nucleus agent, a sliding agent, a stabilizer, a blocking preventive, an ultraviolet absorber, a viscosity controller, a defoaming and clarifying agent, an antistatic agent, a pH adjustor, a dye and a pigment may be added in each process of synthesis.

The controlling methods of the intrinsic viscosity and the molecular weight (the number average molecular weight and the weight average molecular weight) of polyesters are not particularly restricted in the invention and conventionally well-known methods can be used. For example, a method of investigating in advance the correspondence of the intrinsic viscosity (the number average molecular weight and the weight average molecular weight) to the torque applied to the stirrer of the polymerization tank, and stopping the polymerization reaction when the prescribed torque is reached can be exemplified. In the case of a polycondensation reaction such as polyester, it is also possible to use a method of investigating in advance the correspondence of the intrinsic viscosity (the number average molecular weight and the weight average molecular weight) to the amount of water (in the case of direct polymerization) or alcohol (in the case of ester exchange reaction) discharged out of the reaction system at the time of polymerization, and stopping the polymerization reaction at the stage when the prescribed amount of water or alcohol is discharged. As another method, it is also preferred to advance polymerization once to reach the intrinsic viscosity (the number average molecular weight and the weight average molecular weight) exceeding the prescribed range, examining in advance the correspondence of the intrinsic viscosity at the melting time to the melt viscosity, and controlling, at the time of film forming, the existing time of the polymer in extruder before melt and/or after melt so that the melt viscosity comes into the prescribed range. The above methods are described as examples and the present invention is not limited to these methods.

Polyester films in the invention have a Young's modulus in the machine direction of preferably from 7.0 to 8.6 GPa, in the transverse direction of from 5.4 to 8.0 GPa. If the Young's modulus in the machine direction of a polyester film exceeds 8.6 GPa, when the film is used as a magnetic tape for digital use, the sound of the rotating head of a digital video recorder striking the tape produces resonance, which is not preferred. While when the Young's modulus in the transverse direction is less than 5.4 GPa, the strength of the magnetic tape in the transverse direction is insufficient, so that the tape is liable to be folded by a guide pin for regulating tape pass in running, which is not preferred.

The polyester film in the invention preferably has the surface roughness (SRa) of the surface on the side having a magnetic layer (side A) measured with a stylus type, three-dimensional mean surface roughness meter of from 1 to 6 nm, more preferably from 2 to 5 nm. SRa (A) in this range is preferred to obtain a smooth magnetic layer, and also preferred to maintain suitable running durability and obtain high output. The surface roughness (SRa) of the surface on the side having aback coat layer (side B), that is, the opposite side to side A, by the stylus type, three-dimensional mean surface roughness meter is preferably from 6 to 10 nm. SRa (B) in this range is preferred to obtain a back coat layer having proper surface roughness, as a result, a good handling property can be obtained by suppressing the increase of the friction coefficient, and the impression of the roughness of the surface of side B to the surface of side A or the transfer of configuration to thereby roughen the magnetic layer surface can be prevented hen the film is rolled round a reel.

In the invention, SRa (A) and SRa (B) mean the values obtained by the measurement with a stylus type, three-dimensional mean surface roughness meter according to JIS B 0601.

For forming side A in a polyester film, it is preferred for the polyester to contain fine particles having an average particle size of from 30 to 150 nm, preferably from 40 to 100 nm, in proportion of 0.1 mass % or less, preferably 0.06 mass % or less. From the point of the durability of a magnetic layer, it is preferred to contain the fine particles. As such fine particles, silica, calcium carbonate, alumina, polyacrylic particles and polystyrene particles can be preferably used.

It is preferred that side B of the polyester is rougher than side A, that is, SRa (A)<SRa (B), in view of the film forming process of a nonmagnetic support, the manufacturing process of a magnetic recording medium and the running stability of a tape.

The methods of making side B rougher than side A are not particularly limited, but a method of laminating at least two kinds of polyester films different in the kinds, the average particle sizes and/or the addition amounts of fine particles is preferred. As the method of laminating the layers of polyester films, a co-extrusion process is preferably used. At that time, the thickness of the layer of the polyester film forming side B is preferably from ½ to ¹/₁₀ of the thickness of the entire film. As the fine particles used in the layer of the polyester film forming side B, calcium carbonate, silica, alumina, polystyrene particles and silicone resin particles are exemplified. The average particle size of these fine particles is preferably from 80 to 800 nm, more preferably from 100 to 700 nm, and the addition amount is preferably from 0.05 to 1.0 mass %, more preferably from 0.08 to 0.8 mass %.

Polyester films for use in the invention can be manufactured according to conventionally well-known methods. In the case of a laminated polyester film, for example, the polyester for forming side A and the polyester for forming side B are laminated in a die by using a well-known extruder, the laminated polyester is extruded from a nozzle in the form of a sheet at temperature of from a melting point (Tm) to Tm+70° C., and then the extruded polyester is suddenly cooled and set at from 40 to 90° C., whereby a laminated unstretched film is obtained. After that, the unstretched film is stretched by an ordinary method in a uniaxial direction by 2.5 to 4.5 times, preferably from 2.8 to 3.9 times, at temperatures around (glass transition temperature (Tg)–10° C.) to (Tg+70° C.), and then in the right angle direction to the former direction by 4.5 to 8.0 times, preferably from 4.5 to 6.0 times, at temperatures around Tg to (Tg+70° C.), and further if necessary, again in the machine direction and/or transverse direction, whereby a biaxially oriented film is obtained. That is, it is preferred to perform stretching of two stages, three stages, four stages, or multi-stages. The total stretch magnification is generally 12 times or more in terms of area stretch magnification, preferably from 12 to 32 times, more preferably from 14 to 26 times. The biaxially oriented film is given excellent dimensional stability by subsequent heat fixation crystallization at temperature of from (Tg+70° C.) to (Tm–10° C.), e.g., from 180 to 250° C. The time of heat fixation is preferably from 1 to 60 seconds. It is preferred to adjust a heat shrinkage factor in the heat fixation treatment by relaxing the film by 3.0% or less, preferably from 0.5 to 2.0%, in the machine direction and/or transverse direction.

After preparation of a web of a nonmagnetic support in the invention, the web is cut to a prescribed width with a cutter having a slitting blade in the machine direction of a film. Cutting can be performed after a coating layer, e.g., a magnetic layer, has been provided or before providing. For lessening the difference between concavity and convexity on the cross section of an edge, the shear rate and the degree of abrasion of a slitting blade for slitting can be adjusted.

Magnetic Layer

Ferromagnetic Powder:

As the ferromagnetic powders in a magnetic layer of the magnetic recording medium in the invention, ferromagnetic metal powders and hexagonal ferrite powders are exemplified.

Ferromagnetic Metal Powder:

Ferromagnetic alloy powders comprising α-Fe as the main component are preferably used as the ferromagnetic metal powders in the invention. These ferromagnetic powders may contain, in addition to the prescribed atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr and B. It is preferred to contain at least one of Al, Si, Ca, Y, Ba, La, Nd, Sm, Co, Ni and B in addition to α-Fe, and it is more preferred to contain at least one of Co, Y, Al Nd and Sm. The content of Co is preferably from 0 to 40 atomic % based on Fe, more preferably from 15 to 35 atomic %, and still more preferably from 20 to 35 atomic %. The content of Y is preferably from 1.5 to 12 atomic %, more preferably from 3 to 10 atomic %, and still more preferably from 4 to 9 atomic %. The content of Al is preferably from 1.5 to 12 atomic %, more preferably from 3 to 10 atomic %, and still more preferably from 4 to 9 atomic %.

These ferromagnetic metal powders may be treated with the later-described dispersants, lubricants, surfactants and antistatic agents in advance before dispersion. A small amount of water, hydroxide or oxide may be contained in ferromagnetic metal powders. Ferromagnetic metal powders preferably have a moisture content of from 0.01 to 2%. It is preferred to optimize the moisture content of ferromagnetic metal powders by selecting the kinds of binders. The pH of ferromagnetic metal powders is preferably optimized by the combination with the binder to be used. The pH range is generally from 6 to 12, preferably from 7 to 11.

Ferromagnetic powders for use in the invention preferably have less voids and the value of the voids is preferably 20% by volume or less, and more preferably 5% by volume or less.

The crystallite size of ferromagnetic metal powders is preferably from 8 to 20 nm, more preferably from 10 to 18 nm, and still more preferably from 12 to 16 nm. The crystallite size is the average value obtained from the half value width of diffraction peak with an X-ray diffractometer (RINT 2000 series, manufactured by Rigaku Denki Co.) on the conditions of radiation source of CuKα1, tube voltage of 50 kV and tube current of 300 mA by Scherrer method.

Ferromagnetic metal powders have a specific surface area ($S_{BET}$) measured by a BET method of preferably 30 m²/g or more and less than 50 m²/g, more preferably from 38 to 48 m²/g. When the specific surface area of ferromagnetic metal powders is in this range, good surface properties are compatible with low noise. The pH of ferromagnetic metal powders is preferably optimized by the combination with the binder to be used. The pH range is preferably from 4 to 12, more preferably from 7 to 10. Ferromagnetic metal powders may be subjected to surface treatment with Al, Si, P or oxides of them, if necessary, and the amount of the surface-treating compound is from 0.1 to 10% based on the amount of the ferromagnetic metal powders. By the surface treatment, the adsorption amount of lubricant, e.g., fatty acid, preferably becomes 100 mg/m$^2$ or less. Soluble inorganic ions of, e.g., Na, Ca, Fe, Ni and Sr, are sometimes contained in ferromagnetic powders. It is preferred that inorganic ions are substantially not contained, but the properties of ferromagnetic powders are not particularly affected if the content is 200 ppm or less.

The shape of ferromagnetic metal powders is not particularly restricted so long as the above characteristics of particle size are satisfied, and any shape such as an acicular, granular, ellipsoidal or tabular shape may be used, but it is particularly preferred to use acicular ferromagnetic powders. When acicular ferromagnetic metal powders are used, the average long axis length is preferably from 30 to 60 nm, more preferably from 30 to 45 nm. The acicular ratio is preferably from 4 to 12, more preferably from 5 to 12.

The coercive force (Hc) of ferromagnetic metal powders is preferably from 159.2 to 238.8 kA/m (from 2,000 to 3,000 Oe), more preferably from 167.2 to 230.8 kA/m (from 2,100 to 2,900 Oe). The saturation magnetic flux density of ferromagnetic metal powders is preferably from 150 to 300 T·m (from 1,500 to 3,000 G), more preferably from 160 to 290 T·m (from 1,600 to 2,900 G) The saturation magnetization ($\sigma$s) is preferably from 140 to 170 A·m$^2$/kg (from 140 to 170 emu/g), more preferably from 145 to 160 A·m$^2$/kg (from 145 to 160 mu/g). SFD (Switching Field Distribution) of magnetic powders themselves is preferably small, preferably 0.8 or less. When SFD is 0.8 or less, electromagnetic characteristics are excellent, high output can be obtained, magnetic flux revolution becomes sharp and peak shift becomes small, therefore, suitable for high density digital magnetic recording. To achieve small Hc distribution, making particle size distribution of goethite in ferromagnetic metal powders good, using monodispersed $\alpha$-Fe$_2$O$_3$, and preventing sintering among particles are effective methods.

Ferromagnetic metal powders manufactured by well-known methods can be used in the invention, and such methods include a method of reducing a water-containing iron oxide having been subjected to sintering preventing treatment, or an iron oxide with reducing gas, e.g., hydrogen, to thereby obtain Fe or Fe—Co particles; a method of reducing a composite organic acid salt (mainly an oxalate) with reducing gas, e.g., hydrogen; a method of thermally decomposing a metal carbonyl compound; a method of reduction by adding a reducing agent, e.g., sodium boron hydride, hypophosphite or hydrazine, to an aqueous solution of a ferromagnetic metal; and a method of evaporating a metal in low pressure inert gas to thereby obtain fine powder. The thus-obtained ferromagnetic metal powders are subjected to well-known gradual oxidation treatment. As such treatment, a method of forming an oxide film on the surfaces of ferromagnetic metal powders by reducing a water-containing iron oxide or an iron oxide with reducing gas, e.g., hydrogen, and regulating partial pressure of oxygen-containing gas and inert gas, the temperature and the time is little in demagnetization and preferred.

Ferromagnetic Hexagonal Ferrite Powder:

The examples of ferromagnetic hexagonal ferrite powders include substitution products of barium ferrite, strontium ferrite, lead ferrite and calcium ferrite, and Co substitution products of these ferrites. Specifically, magnetoplumbite type barium ferrite and strontium ferrite, magnetoplumbite type ferrites having covered the particle surfaces with spinel, and magnetoplumbite type barium ferrite and strontium ferrite partially containing spinel phase can be exemplified. Ferromagnetic hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, ferromagnetic hexagonal ferrite powders containing the following elements can be used, e.g., Co—Zn, Co—Ti, Co—Ti—Zr, Co—Ti—Zn, Ni—Ti—Zn, Nb—Zn—Co, Sb—Zn—Co and Nb—Zn. According to starting materials and manufacturing methods, specific impurities may be contained.

The particle size of ferromagnetic hexagonal ferrite powder is preferably from 5 to 40 nm as the average tabular size, more preferably from 10 to 38 nm, and particularly preferably from 15 to 36 nm. The tabular size used here means the longest hexagonal diameter of the base of the hexagonal pole of hexagonal ferrite powder, and the average tabular size is the arithmetic mean of it. When reproduction is performed using a magneto-resistance head in particular for increasing track density, it is particularly necessary to reduce noise, accordingly the tabular size is preferably 36 nm or less. However, when the tabular size is in the range of from 5 to 40 nm, stable magnetization free from the influence of thermal fluctuation can be expected and, at the same time, noise can be suppressed, so that the hexagonal ferrite powder is suitable for high density magnetic recording. The average tabular thickness is preferably from 1 to 30 nm, more preferably from 2 to 25 nm, and particularly preferably from 3 to 20 nm. The tabular ratio (tabular diameter/tabular thickness) is preferably from 1 to 15, more preferably from 1 to 7. When the tabular ratio is in the range of from 1 to 15, sufficient orientation can be attained while maintaining high packing density in a magnetic layer and, at the same time, the increase of noise due to stacking among particles can be prevented. The specific surface area (SBET) measured by a BET method of particles in the above particle size range is from 10 to 200 m$^2$/g. The specific surface area nearly coincides with the calculated value from the tabular diameter and the tabular thickness of a particle.

The distribution of tabular diameter•tabular thickness of ferromagnetic hexagonal ferrite powder particles is generally preferably as narrow as possible. It is difficult to show the distribution of tabular diameter•tabular thickness of particles in numerical values but the distributions can be compared by measuring 500 particles selected randomly from TEM photographs of particles. The distributions of tabular diameter•tabular thickness of particles are in many cases not regular distributions, but when expressed in the standard deviation to the average size by calculation, $\sigma$/average size is from 0.1 to 2.0. For obtaining narrow particle size distribution, it is efficient to make a particle-forming reaction system homogeneous as far as possible, and to subject particles formed to distribution improving treatment as well. For instance, a method of selectively dissolving superfine particles in an acid solution is also known.

The coercive force (Hc) of hexagonal ferrite particles can be made from 159.2 to 238.8 kA/m (from 2,000 to 3,000 Oe), but Hc is preferably from 175.1 to 222.9 kA/m (from 2,200 to 2,800 Oe), and more preferably from 183.1 to 214.9 kA/m (from 2,300 to 2,700 Oe). However, if the saturation magnetization ($\sigma_s$) of the head exceeds 1.4 T, it is preferred that Hc is 159.2 kA/m or less. Coercive force (Hc) can be controlled by the particle size (tabular diameter•tabular thickness), the kinds and amounts of the elements contained in the hexagonal ferrite powder, the substitution sites of the elements, and the particle forming reaction conditions.

The saturation magnetization ($\sigma_s$) of hexagonal ferrite particles is preferably from 40 to 80 A·m$^2$/kg (emu/g). Saturation magnetization ($\sigma_s$) is preferably higher, but it has the inclination of becoming smaller as particles become finer. For improving saturation magnetization ($\sigma_s$), compounding spinel ferrite to magnetoplumbite ferrite, and the selection of the kinds and the addition amount of elements to be contained are well known. It is also possible to use W-type hexagonal ferrite. In dispersing magnetic powders, the particle surfaces of magnetic particles may be treated with dispersion media and substances compatible with the polymers. In organic and organic compounds are used as surface-treating agents. For example, oxides or hydroxides of Si, Al and P, various kinds of silane coupling agents and various kinds of titanium coupling agents are primarily used as such compounds. The addition amount of these surface-treating agents is from 0.1 to 10 mass % based on the mass of the magnetic powder. The pH of magnetic powders is also important for dispersion, and the pH is generally from 4 to 12 or so. The optimal value of the pH is dependent upon the dispersion media and the polymers. Taking the chemical stability and storage stability of the medium into consideration, pH of from 6 to 11 or so is selected. The moisture content in magnetic powders also affects dispersion. The optimal value of the moisture content is dependent upon the dispersion media and the polymers, and the moisture content of from 0.01 to 2.0% is selected in general.

The manufacturing methods of ferromagnetic hexagonal ferrites include the following methods and any of these methods can be used in the invention with no restriction: (1) a glass crystallization method comprising the steps of mixing metallic oxide which substitutes barium oxide, iron oxide, iron with boron oxide as a glass-forming material so as to make a desired ferrite composition, melting and then quenching the ferrite composition to obtain an amorphous product, treating by reheating, washing and pulverizing the amorphous product, to thereby obtain barium ferrite crystal powder; (2) a hydro-thermal reaction method comprising the steps of neutralizing a solution of barium ferrite composition metallic salt with an alkali, removing the byproducts produced, heating the liquid phase at 100° C. or more, washing, drying and then pulverizing, to thereby obtain barium ferrite crystal powder; and (3) a coprecipitation method comprising the steps of neutralizing a solution of barium ferrite composition metallic salt with an alkali, removing the byproducts produced and drying, treating the system at 1,100° C. or less, and then pulverizing to obtain barium ferrite crystal powder. Ferromagnetic hexagonal ferrite powders may be subjected to surface treatment with Al, Si, P or oxides of them, if necessary, and the amount of the surface-treating compound is from 0.1 to 10% based on the amount of the hexagonal ferrite powders. By the surface treatment, the adsorption amount of lubricant, e.g., fatty acid, preferably becomes 100 mg/m$^2$ or less. Hexagonal ferrite powders sometimes contain soluble inorganic ions of, e.g., Na, Ca, Fe, Ni and Sr, but it is preferred that these inorganic ions are not substantially contained, but the properties of hexagonal ferrite powders are not particularly affected if the amount is 200 ppm or less.

Binder:

Conventionally well-known thermoplastic resins, thermosetting resins, reactive resins and the mixtures of these resins are used as the binder in a magnetic layer in the invention. The examples of thermoplastic resins include polymers or copolymers containing, as the constituting unit, vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal and vinyl ether; polyurethane resins and various rubber resins.

The examples of thermosetting resins and reactive resins include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. Thermoplastic resins, thermosetting resins and reactive resins are described in detail in *Plastic Handbook*, Asakura Shoten.

When an electron beam-curable resin is used in a magnetic layer, not only film strength and durability are improved but also surface smoothness and electromagnetic characteristics are further improved. The examples of these resins and manufacturing methods are disclosed in JP-A-62-256219 in detail.

The above resins can be used alone or in combination. It is particularly preferred to use polyurethane resins. It is more preferred to use hydrogenated bisphenol A; polyurethane resins obtained by reacting a compound having a cyclic structure such as polypropylene oxide adduct of hydrogenated bisphenol A, polyol having an alkylene oxide chain and a molecular weight of from 500 to 5,000, polyol having a cyclic structure and a molecular weight of from 200 to 500 as the chain extender, and organic diisocyanate, and introducing a polar group thereto; polyurethane resins obtained by reacting aliphatic dibasic acid such as succinic acid, adipic acid or sebacic acid, polyester polyol comprising aliphatic diol having a branched alkyl side chain and not having a cyclic structure such as 2,2-dimethyl-1,3-propanediol, 2-ethyl-2-butyl-1,3-propanediol, or 2,2-diethyl-1,3-propanediol, aliphatic diol having a branched alkyl side chain and having 3 or more carbon atoms such as 2-ethyl-2-butyl-1,3-propanediol or 2,2-diethyl-1,3-propanediol as the chain extender, and an organic diisocyanate compound, and introducing a polar group thereto; or polyurethane resins obtained by reacting a compound having a cyclic structure such as dimer diol, a polyol compound having a long alkyl chain, and organic diisocyanate, and introducing a polar group thereto.

The average molecular weight of polar group-containing polyurethane resins usable in the invention is preferably from 5,000 to 100,000, more preferably from 10,000 to 50,000. When the average molecular weight is 5,000 or more, the obtained magnetic layer is not accompanied by the reduction of physical strength, such as the brittleness of the layer, and the durability of the magnetic recording medium is not influenced. While when the average molecular weight is 100,000 or less, the solubility in a solvent does not decrease, so that good dispersibility can be obtained, in addition, the coating viscosity in the prescribed concentration does not increase, so that good working properties can be obtained and handling becomes easy.

As the polar groups contained in the above polyurethane resins, —COOM, —SO$_3$M, —OSO$_3$M, —P=O(OM)$_2$, —O—P=O(OM)$_2$ (wherein M represents a hydrogen atom or an alkali metal salt group), —OH, —NR$_2$, —N$^+$R$_3$ (wherein R represents a hydrocarbon group), an epoxy group, —SH and —CN are exemplified. Polyurethane resins to which one or more of these polar groups are introduced by copolymerization or addition reaction can be used. When these polar group-containing polyurethane resins have an OH group, to have a branched OH group is preferred from the aspects of curability and durability, to have from 2 to 40 branched OH groups per a molecule is preferred, and to have from 3 to 20 groups is more preferred. The amount of these polar groups is from $10^{-1}$ to $10^{-8}$ mol/g, preferably from $10^{-2}$ to $10^{-6}$ mol/g.

The specific examples of binders include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.), Nippollan N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Ink and Chemicals Inc.), Vylon UR8200, UR8300, UR8700, RV530 and RV280 (manufactured by Toyobo Co., Ltd.), Daipheramine 4020, 5020, 5100, 5300, 9020, 9022 and 7020 (manufactured by Dainichiseika Color & Chemicals Mfg. Co., Ltd), MX5004 (manufactured by Mitsubishi Kasei Corp.), Sanprene SP-150 (manufactured by Sanyo Chemical Industries, Ltd.), Saran F310 and F210 (manufactured by Asahi Kasei Corporation).

The addition amount of binders for use in a magnetic layer of the invention is from 5 to 50 mass %, preferably from 10 to 30 mass %, based on the mass of the ferromagnetic powder (ferromagnetic metal powder or ferromagnetic hexagonal ferrite powder). When polyurethane resins are used, the amount is from 2 to 20 mass %, when polyisocyanate is used, the amount is from 2 to 20 mass %, and it is preferred to use them in combination, however, for instance, when corrosion of the head is caused by a slight amount of chlorine due to dechlorination, it is possible to use polyurethane alone or a combination of polyurethane and isocyanate alone. When a vinyl chloride resin is used as other resin, the addition amount is preferably from 5 to 30 mass %. When polyurethane is used in the invention, the polyurethane has a glass transition temperature of preferably from −50 to 150° C., more preferably from 0 to 100° C., breaking extension of preferably from 100 to 2,000%, breaking stress of preferably from 0.49 to 98 MPa (from 0.05 to 10 kg/mm$^2$), and a yielding point of preferably from 0.49 to 98 MPa (from 0.05 to 10 kg/mm$^2$).

The examples of polyisocyanates usable in the invention include isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; products of these isocyanates with polyalcohols; and polyisocyanates formed by condensation reaction of isocyanates. These isocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These compounds may be used alone, or in combination of two or more in each layer taking advantage of the difference in curing reactivity.

The above binders can be used in the layers other than a magnetic layer, e.g., a nonmagnetic layer and a back coat layer. When a magnetic layer comprises two or more layers, binders can be used in each magnetic layer. In that case, the amount of the binder, the amounts of vinyl chloride resins, polyurethane resins, polyisocyanate or other resins contained in the binder, the molecular weight and the amount of polar groups of each resin constituting the magnetic layer, or the physical properties of the above described resins can of course be varied in the nonmagnetic layer, the back coat layer and each magnetic layer, according to necessity. These factors should be rather optimized in respective layers. Well-known prior arts with respect to multilayer magnetic layers can be used in the invention. For example, when the amount of a binder is varied in each layer, it is effective to increase the amount of a binder contained in a magnetic layer to reduce scratches on the surface of the magnetic layer. For improving the head touch against a head, it is effective to increase the amount of a binder in a nonmagnetic layer to impart flexibility.

Carbon blacks can be used in a magnetic layer for the purpose of static charge prevention, the reduction of friction coefficient, the impartation of a light-shielding property, and the improvement of film strength. Carbon blacks used in a magnetic layer are furnace blacks for rubbers, thermal blacks for rubbers, carbon blacks for coloring, and acetylene blacks. Carbon blacks preferably have a specific surface area of from 5 to 500 m$^2$/g, a DBP oil absorption amount of from 10 to 400 ml/100 g, an average particle size of from 5 to 300 nm, a pH value of from 2 to 10, a moisture content of from 0.1 to 10 mass %, and a tap density of from 0.1 to 1 g/ml. The specific examples of carbon blacks for use in the invention include BLACKPEARLS 2000, 1300, 1000, 900, 905, 800, 700, and VULCAN XC-72 (manufactured by Cabot Co., Ltd.), #80, #60, #55, #50 and #35 (manufactured by ASAHI CARBON CO., LTD), #2400B, #2300, #900, #1000, #30, #40 and #10B (manufactured by Mitsubishi Kasei Corp.), CONDUCTEX SC, RAVEN 150, 50, 40, 15, and RAVEN-MT-P (manufactured by Columbia Carbon Co., Ltd.), and Ketjen Black EC (manufactured by Nippon EC Co., Ltd.).

Carbon blacks may be surface-treated with a dispersant, may be grafted with resins, or a part of the surface may be graphitized in advance before use. Carbon blacks may be previously dispersed in a binder before being added to a magnetic coating solution. Carbon blacks can be used alone or in combination.

It is preferred to use carbon blacks in an amount of from 0.1 to 30 mass % based on the magnetic powder. Carbon blacks can serve various functions such as the prevention of the static charge and the reduction of the friction coefficient of a magnetic layer, the impartation of a light-shielding property to a magnetic layer, and the improvement of the film strength of a magnetic layer. Such functions vary by the kind of the carbon black to be used.

With respect to carbon blacks that can be used in the invention, e.g., *Carbon Black Binran* (*Handbook of Carbon Blacks*), compiled by Carbon Black Kyokai can be referred to.

Abrasive:

A magnetic layer may contain abrasives in the invention. As the abrasives usable in the invention, well-known materials essentially having a Mohs' hardness of 6 or more may be used alone or in combination, e.g., α-alumina having an α-conversion rate of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride are exemplified. Composites composed of these abrasives (abrasives obtained by surface-treating with other abrasives) can also be used.

Compounds or elements other than the main component are often contained in abrasives in the invention, but the intended effect can be obtained so far as the content of the main component is 90 mass % or more. Abrasives have an average particle size of preferably from 0.01 to 2 μm, and in particular for improving electromagnetic characteristics (particularly S/N), abrasives having narrow particle size distribution are preferred. For improving durability, a plurality of abrasives each having a different particle size may be combined according to necessity, or a single abrasive having broad particle size distribution may be used so as to achieve the same effect as such a combination.

Abrasives for use in the invention preferably have a tap density of from 0.3 to 2 g/ml a moisture content of from 0.1 to 5 mass %, a pH value of from 2 to 11, and a specific surface area of from 1 to 30 m$^2$/g. The shape of the abrasives to be used in the invention may be any of acicular, spherical and die-like shapes. Abrasives having a shape partly with edges are preferred for their high abrasive property. Specifically, abrasives disclosed in WO 98/35345 are exemplified. Using diamonds in the manner as disclosed in WO 98/35345 is effective to improve running durability and electromagnetic characteristics. The particle sizes and the amounts of abrasives to be used in a magnetic layer and a nonmagnetic layer are of course set at optimal values.

Other Additives:

Additives having a lubricating effect, an antistatic effect, a dispersing effect and a plasticizing effect can be used in the invention.

For example, molybdenum disulfide, tungsten disulfide, graphite, boron nitride, graphite fluoride, silicone oil, polar group-containing silicone, fatty acid-modified silicone, fluorine-containing silicone, fluorine-containing alcohol, fluorine-containing ester, polyolefin, polyglycol, alkyl phosphoric ester and alkali metal salt thereof, alkyl sulfuric ester and alkali metal salt thereof, polyphenyl ether, phenylphosphonic acid, α-naphthylphosphoric acid, phenylphosphoric acid, diphenylphosphoric acid, p-ethylbenzenephosphonic acid, phenylphosphinic acid, aminoguinones, various kinds of silane coupling agents, titanium coupling agents, fluorine-containing alkylsulfuric ester and alkali metal salt thereof, monobasic fatty acids having from 10 to 24 carbon atoms (which may contain an unsaturated bond or may be branched) and metal salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohol having from 12 to 22 carbon atoms (which may contain an unsaturated bond or may be branched), fatty acid monoester, fatty acid diester or fatty acid triester composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid ester of monoalkyl ether of alkylene oxide polymerized product, fatty acid amides having from 8 to 22 carbon atoms, and aliphatic amines having from 8 to 22 carbon atoms are exemplified.

The specific examples of fatty acids include capric acid, caprylic acid, lauric acid, myristic acid, palmitic acid, stearic acid, behenic acid, oleic acid, elaidic acid, linoleic acid, linolenic acid and isostearic acid. The examples of esters include butyl stearate, octyl stearate, amyl stearate, isooctyl stearate, butyl myristate, octyl myristate, butoxyethyl stearate, butoxydiethyl stearate, 2-ethylhexyl stearate, 2-octyl-dodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleyl and the examples of alcohols include oleyl alcohol, stearyl alcohol and lauryl alcohol.

As additives, nonionic surfactants such as alkylene oxides, glycerols, glycidols, and alkylphenol-ethylene oxide adducts; cationic surfactants such as cyclic amines, ester amides, quaternary ammonium salts, hydantoin derivatives, heterocyclic rings, phosphoniums, and sulfoniums; anionic surfactants containing an acidic group, e.g., carboxylic acid, sulfonic acid, phosphoric acid, sulfuric ester groups and phosphoric ester groups; and amphoteric surfactants such as aminoacids, amino sulfonic acids, sulfuric or phosphoric esters of amino alcohols, and alkylbetaines can also be used. The details of these surfactants are described in *Kaimen Kasseizai Binran* (*Handbook of Surfactants*), Sangyo Tosho Publishing Co., Ltd.

These additives need not be 100% pure and may contain impurities such as isomers, unreacted products, byproducts, decomposed products and oxides, in addition to the main component. However, the content of such impurities is preferably 30 mass % or less, more preferably 10 mass % or less.

These additives for use in the invention respectively have different physical functions. The kinds, amounts and combining proportions bringing about synergistic effects of these additives should be determined optimally in accordance with the purpose.

In general, the total amount of additives is from 0.1 to 50 mass %, preferably from 2 to 25 mass %, based on the amount of the magnetic powder in a magnetic layer or the nonmagnetic powder in a nonmagnetic powder.

All or a part of the additives used in the invention may be added in any step of the preparation of a magnetic layer coating solution. For example, additives may be blended with magnetic powder before a kneading step, may be added in a step of kneading magnetic powder, a binder and a solvent, may be added in a dispersing step, may be added after a dispersing step, or may be added just before coating. According to the purpose, there is a case of capable of attaining the object by coating all or a part of the additives simultaneously with or successively after the coating of a magnetic layer. Further, according to the purpose, additives may be coated on the surface of a magnetic layer after calendering treatment (heating and pressing treatment with calender rolls), or after the completion of slitting.

In the invention, a magnetic layer coating solution is prepared by kneading and dispersing a binder and magnetic powder with an organic solvent generally used in manufacturing a magnetic layer coating solution. A magnetic layer coating solution may contain an abrasive, a carbon black and other additives.

Organic solvents are used in an arbitrary rate in coating solutions. The examples of organic solvents include ketones, e.g., acetone, methyl ethyl ketone, methyl isobutyl ketone, diisobutyl ketone, cyclohexanone, isophorone, and tetrahydrofuran; alcohols, e.g., methanol, ethanol, propanol, butanol, isobutyl alcohol, isopropyl alcohol, and methylcyclohexanol; esters, e.g., methyl acetate, ethyl acetate, butyl acetate, isobutyl acetate, isopropyl acetate, ethyl lactate, and glycol monoethyl ether acetate; ethers, e.g., diethyl ether, tetrahydrofuran, glycol dimethyl ether, glycol monoethyl ether, and dioxane; tars (aromatic hydrocarbons), e.g., benzene, toluene, xylene, cresol, chlorobenzene, and styrene; chlorinated hydrocarbons, e.g., methylene chloride, ethylene chloride, carbon tetrachloride, chloroform, ethylene chlorohydrin and dichlorobenzene; and N,N-dimethylformamide and hexane. These solvents are generally used as mixtures of two or more in an arbitrary mixing ratio. These solvents may contain 1 mass % or less of impurities (e.g., the polymerized products of the solvents themselves, water and starting materials). These solvents are used in an amount of from 100 to 20,000 mass parts per 100 mass parts of the total solids content of the magnetic layer coating solution. The preferred solids content of a preferred magnetic layer coating solution is from 5 to 20 mass %. Aqueous solvents (water, alcohol, acetone, etc.) may be used in place of organic solvents.

The dispersing and kneading methods of each component constituting a magnetic layer coating solution are not particularly restricted, and the addition order of each component (a binder, powder, a lubricant, a solvent, etc.), the position of addition in dispersion and kneading, the temperature of dispersion (from 0 to 80° C.) can be optionally determined. In the preparation of a magnetic layer coating solution, generally used kneader, e.g., a twin roll mill, a triple roll mill, a ball mill, a pebble mill, a trommel, a sand mill, a Szegvari, an attritor, a high speed impeller, a dispersing machine, a high speed stone mill, a high speed impact mill, a disper, a kneader, a high speed mixer, a ribbon blender, a co-kneader, an intensive mixer, a tumbler, a blender, a disperser, a homogenizer, a single screw extruder, a double screw extruder, and ultrasonic wave disperser can be used. In general, a plurality of these dispersing and kneading apparatus are prepared for continuous treatment. The details of the techniques concerning kneading and dispersion are described in T. C. Patton, *Paint Flow and Pigment Dispersion*, John Wiley & Sons (1964), Shinichi Tanaka, *Kogyo Zairyo* (*Industrial Materials*), Vol. 25, No. 37 (1977), and bibliographies cited in these literatures. As auxiliary materials for efficiently carrying out dispersion and kneading, steel balls, steel beads, ceramic beads, glass beads and organic polymer beads each having an equivalent-sphere diameter of from 0.05 mmϕ to 10 cmϕ can be used. These materials are not limited to spheres. These are also disclosed in U.S. Pat. Nos. 2,581,414 and 2,855,156. A magnetic layer coating solution can be prepared also in the invention by performing kneading and dispersion according to the methods described in the above literatures and bibliographies cited therein.

Nonmagnetic Layer

The magnetic recording medium in the invention may have a nonmagnetic layer between a magnetic layer and a nonmagnetic support. It is preferred to provide a nonmagnetic layer for thinning the thickness of a magnetic layer suitable for high density recording. A nonmagnetic layer is described in detail below.

A nonmagnetic layer in the invention exhibits its effect so long as it is substantially nonmagnetic, and even if, or intentionally, a small amount of magnetic powder is contained as the impurity, it reveals the effect of the invention, and as a matter of course the nonmagnetic layer can be regarded as essentially the same constitution as in the invention.

A nonmagnetic layer here means that the residual magnetic flux density of the nonmagnetic layer is 10 T·m or less or the coercive force (Hc) is 8 kA/m (100 Oe) or less, preferably the residual magnetic flux density and the coercive force are zero. When a nonmagnetic layer contains magnetic powder, the content of the magnetic powder is preferably less than ½ of the entire inorganic powders in the nonmagnetic layer.

A soft magnetic layer comprising soft magnetic powder and a binder may be formed in place of a nonmagnetic layer. The thickness of a soft magnetic layer is the same as a nonmagnetic layer.

A nonmagnetic layer in the invention preferably comprises nonmagnetic inorganic powder and a binder as the main components.

Nonmagnetic inorganic powders for use in a nonmagnetic layer can be selected from inorganic compounds, e.g., metallic oxide, metallic carbonate, metallic sulfate, metallic nitride, metallic carbide and metallic sulfide. The examples of inorganic compounds are selected from the following compounds and they can be used alone or in combination, e.g., α-alumina having an α-conversion rate of 90% or more, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred for the reason that they have small particle size distribution and various means for imparting functions, and titanium dioxide and α-iron oxide are more preferred.

These nonmagnetic inorganic powders preferably have an average particle size of from 5 to 200 nm. If necessary, a plurality of nonmagnetic inorganic powders each having a different particle size may be combined, or a single nonmagnetic inorganic powder may have broad particle size distribution so as to attain the same effect as such a combination. Nonmagnetic inorganic powders particularly preferably have an average particle size of from 10 to 200 nm. In particular, when nonmagnetic inorganic powder is a granular metallic oxide, the average particle size of the powder is preferably 80 nm or less, and when nonmagnetic inorganic powder is an acicular metallic oxide, the average long axis length of the powder is preferably 300 nm or less, more preferably 200 nm or less.

Nonmagnetic inorganic powders for use in the invention have a tap density of preferably from 0.05 to 2 g/ml, more preferably from 0.2 to 1.5 g/ml; a moisture content of preferably from 0.1 to 5 mass %, more preferably from 0.2 to 3 mass %, and still more preferably from 0.3 to 1.5 mass %; a pH value of from 2 to 11, and particularly preferably between 5.5 and 10; a specific surface area of preferably from 1 to 100 $m^2/g$, more preferably from 5 to 80 $m^2/g$, and particularly preferably from 10 to 70 $m^2/g$.

Nonmagnetic inorganic powders for use in the invention have a crystallite size of preferably from 0.004 to 1 μm, more preferably from 0.04 to 0.1 μm; an oil absorption amount using DBP (dibutyl phthalate) of preferably from 5 to 100 ml/100 g, more preferably from 10 to 80 ml/100 g, and still more preferably from 20 to 60 ml/100 g; and a specific gravity of preferably from 1 to 12, and more preferably from 3 to 6. The configuration of nonmagnetic inorganic powders may be any of an acicular, spherical, polyhedral and tabular configurations. Nonmagnetic inorganic powders preferably have a Mohs' hardness of from 4 to 10. The SA (stearic acid) adsorption amount of nonmagnetic inorganic powders is preferably from 1 to 20 μmol/$m^2$, more preferably from 2 to 15 μmol/$m^2$, and still more preferably from 3 to 8 µmol/m². The pH of nonmagnetic inorganic powders is preferably between 3 and 6.

The surfaces of nonmagnetic inorganic powders are preferably covered with $Al_2O_3$, $SiO_2$, $TiO_2$, $ZrO_2$, $SnO_2$, $Sb_2O_3$, ZnO or $Y_2O_3$. $Al_2O_3$, $SiO_2$, $TiO_2$ and $ZrO_2$ are particularly preferred in dispersibility, and $Al_2O_3$, $SiO_2$ and $ZrO_2$ are still more preferred. They may be used in combination or may be used alone. According to purposes, a layer subjected to surface treatment by coprecipitation may be used. Alternatively, surfaces of particles may be covered with alumina previously, and then the alumina-covered surface may be covered with silica, or vice versa, according to purposes. A surface-covered layer may be a porous layer, if necessary, but a homogeneous and dense surface is generally preferred.

The specific examples of nonmagnetic inorganic powders for use in a lower layer in the invention and the producing methods of these compounds are disclosed in WO 98/35345.

Organic powders can also be used in a nonmagnetic layer according to purposes. The examples of organic powders include acrylic styrene resin powders, benzoguanamine resin powders, melamine resin powders, and phthalocyanine pigments. In addition, polyolefin resin powders, polyester resin powders, polyamide resin powders, polyimide resin powders and polyethylene fluoride resin powders can also be used. The producing methods of these organic powders are disclosed in JP-A-62-18564 and JP-A-60-255827.

The binders, lubricants, dispersants, additives, organic solvents, dispersing methods, addition amounts and others used in the above described magnetic layers can be used in a nonmagnetic layer. The kinds and amounts of these additives should be optimally determined according to the objective nonmagnetic layer. For example, a nonmagnetic layer and a magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface, the amount of surfactant is controlled so as to improve the coating stability, or the amount of lubricant in the intermediate layer is made larger so as to improve the lubricating effect. The examples are by no means limited thereto.

Back Coat Layer

In a magnetic recording medium in the invention, a back coat layer may be formed on the surface of the side of a nonmagnetic support opposite to the side having a magnetic layer. By providing a back coat layer, the surface properties of the back surface of the medium can be preferably improved and running durability can be increased. It is preferred for the back coat layer to contain a carbon black and inorganic powder.

Two kinds of carbon blacks respectively having different average particle sizes are preferably used in combination in a back coat layer. In such a case, it is preferred to use a fine carbon black having an average particle size of from 10 to 60 nm and a coarse carbon black having an average particle size of from 100 to 270 nm in combination.

In general, by the addition of a fine carbon black as above, the surface electrical resistance of a back coat layer and light transmittance can be set up at low values respectively. Since there are many kinds of magnetic recording apparatus making use of light transmittance of a tape to make it as a signal of operation, the addition of fine carbon blacks is particularly effective in such a case. In addition, fine carbon blacks are in general excellent in retention of a liquid lubricant and contribute to the reduction of a friction coefficient when lubricants are used in combination. On the other hand, coarse carbon blacks have a function as a solid lubricant and form minute spines on the surface of a back coat layer to thereby reduce the contact area and contribute to the reduction of a friction coefficient.

The specific examples of commercially available fine carbon blacks and coarse carbon blacks used in a back coat layer in the invention are disclosed in WO 98/35345.

When two kinds of carbon blacks respectively having different average particle sizes are used in combination in a back coat layer, the proportion of the contents (by mass) of a fine carbon black and a coarse carbon black is preferably the former/the latter of from 98/2 to 75/25, and more preferably from 95/5 to 85/15. The content of a carbon black in a back coat layer (the total amount when two kinds of carbon blacks are used) is generally from 30 to 80 mass parts per 100 mass parts of the binder, and preferably from 45 to 65 mass parts.

It is preferred to use two kinds of inorganic powders each having different hardness in combination in a back coat layer. Specifically, soft inorganic powder having a Mohs' hardness of from 3 to 4.5 and hard inorganic powder having a Mohs' hardness of from 5 to 9 are preferably used. By using soft inorganic powder having a Mohs' hardness of from 3 to 4.5, a friction coefficient can be stabilized against repeating running. Moreover, a sliding guide pole is not scratched off due to the hardness in this range. The average particle size of the soft inorganic powder is preferably from 30 to 50 nm.

The examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. These soft inorganic powders can be used alone or in combination of two or more. The content of the soft inorganic powders in a back coat layer is preferably from 10 to 140 mass parts based on 100 mass parts of the carbon black, and more preferably from 35 to 100 mass parts.

By the addition of hard inorganic powders having a Mohs' hardness of from 5 to 9, the strength of the back coat layer increases and running durability is improved. When such hard inorganic powders are used together with carbon blacks and the soft inorganic powders, deterioration due to repeating sliding is reduced and a strong back coat layer can be obtained. An appropriate abrasive property is provided to the back coat layer by the addition of the hard inorganic powder and the adhesion of scratched powders to a tape guide pole is reduced. In particular, when hard inorganic powder and soft inorganic powder are used in combination, the sliding characteristics against a guide pole having a rough surface is improved and the stabilization of a friction coefficient of the back coat layer can also be brought about. The average particle size of hard inorganic powders is preferably from 80 to 250 nm, and more preferably from 100 to 210 nm.

The examples of hard inorganic powders having a Mohs' hardness of from 5 to 9 include, e.g., α-iron oxide, α-alumina, and chromium oxide ($Cr_2O_3$). These powders may be used alone or in combination. Of the above hard inorganic powders, α-iron oxide and α-alumina are preferred. The content of hard inorganic powders in a back coat layer is generally from 3 to 30 mass parts per 100 mass parts of the carbon black, and preferably from 3 to 20 mass parts.

When soft inorganic powders and hard inorganic powders are used in combination in a back coat layer, it is preferred to use them selectively such that the difference in hardness between soft and hard inorganic powders is 2 or more, more preferably 2.5 or more, and particularly preferably 3 or more. It is preferred that two kinds of inorganic powders respectively having specific average particle sizes and different Mohs' hardness and two kinds of carbon blacks respectively having different average particle sizes be contained in a back coat layer.

Lubricants may be contained in a back coat layer. The lubricants can be arbitrarily selected from among those usable in a magnetic layer as described above. The content of a lubricant added to a back coat layer is generally from 1 to 5 mass parts per 100 mass parts of the binder.

Undercoat Layer

An undercoat layer may be provided between a nonmagnetic layer and a nonmagnetic support in the invention. By providing an undercoat layer, the adhesion between the nonmagnetic support and the nonmagnetic layer can be improved. As the undercoat layer, polyester resins soluble in an organic solvent are used. The thickness of the undercoat layer can be, e.g., about 0.5 μm or less.

Layer Constitution

The thickness of a nonmagnetic support in a magnetic recording medium according to the invention is preferably from 2 to 80 μm. In the case of a magnetic recording tape for computer, the thickness of a support is preferably from 3.5 to 7.5 μm, more preferably from 3.0 to 7.0 μm. The thickness of an undercoat layer is preferably from 0.1 to 1.0 μm, more preferably from 0.1 to 0.7 μm. The thickness of a back coat layer is preferably from 0.1 to 4 μm, more preferably from 0.3 to 2.0 μm.

The thickness of a nonmagnetic layer and a magnetic layer of a magnetic recording medium in the invention is optimized according to the quantity of saturation magnetization and the head gap length of heads to be used, and the recording signal band. The thickness of a magnetic layer in the invention is preferably 0.2 μm or less, more preferably from 0.02 to 0.15 μm, and still more preferably from 0.02 to 0.13 μm, and the thickness of a nonmagnetic layer is preferably from 0.2 to 5.0 μm, more preferably from 0.3 to 3.0 μm, and still more preferably from 1.0 to 2.5 μm.

When a magnetic recording medium in the present invention comprises two magnetic layers, a nonmagnetic layer and a soft magnetic layer may be or may not be formed and, for example, the thickness of the magnetic layer farther from the support can be preferably form 0.01 to 0.1 μm, more preferably from 0.01 to 0.05 μm, and the thickness of the magnetic layer nearer from the support can be from 0.05 to 0.15 μm.

Manufacturing Method of Magnetic Recording Medium

Processes of preparing a magnetic layer coating solution and a nonmagnetic layer coating solution for use in a magnetic recording medium in the present invention comprises at least a kneading step, a dispersing step and blending steps to be carried out optionally before and/or after the kneading and dispersing steps. Each of these steps may be composed of two or more separate stages. All the materials such as ferromagnetic powder, nonmagnetic inorganic powder, a binder, a carbon black, an abrasive including diamond particles, an antistatic agent, a lubricant and a solvent for use in the magnetic recording medium in the invention may be added in any step at any time, or each material may be added in two or more steps separately. For instance, polyurethane can be added in parts in a kneading step, a dispersing step, or a blending step for adjusting viscosity after dispersion.

For achieving the object of the invention, the above steps can be performed partly with conventionally well-known producing techniques. It is preferred to use powerful kneading machines such as an open kneader, a continuous kneader, a pressure kneader or an extruder in a kneading step. When a kneader is used, magnetic powder or nonmagnetic inorganic powder, and all or a part of a binder (preferably 30 mass % or more of the total amount of the binder, and from 15 to 500 mass parts per 100 mass parts of the ferromagnetic powder or the nonmagnetic inorganic powder) are kneading-treated. Details of kneading treatment are disclosed in JP-A-1-106338 and JP-A-1-79274. For dispersing a magnetic layer coating solution and a nonmagnetic layer coating solution, glass beads can be used, but dispersing media having a high specific gravity, e.g., zirconia beads, titania beads and steel beads are preferably used. Optimal particle sizes and packing rates of these dispersing media should be selected. Well-known dispersing apparatus can be used in the invention.

A nonmagnetic layer coating solution and a magnetic layer coating solution may be multilayer-coated successively or simultaneously. When a magnetic layer comprises two layers, a lower magnetic layer coating solution and an upper magnetic layer coating solution may be multilayer-coated successively or simultaneously. It is preferred to form a nonmagnetic layer and a magnetic layer by a wet-on-dry coating method, that is, a nonmagnetic layer coating solution is coated on a nonmagnetic support and dried to form a nonmagnetic layer, and then a magnetic layer coating solution is coated on the nonmagnetic layer and dried to form a magnetic layer. The coating methods disclosed in JP-A-3-214417 and JP-A-3-214422 are preferably used.

The ferromagnetic metal powder contained in a coated layer of a magnetic layer coating solution is subjected to the treatment of magnetic field orientation in the machine direction with a cobalt magnet and a solenoid.

It is preferred that the drying position of a coated film be controlled by controlling the temperature and the amount of drying air and coating rate. Coating rate is preferably from 20 to 1,000 m/min and the temperature of drying air is preferably 60° C. or higher. Preliminary drying can be carried out appropriately before entering a magnet zone.

After drying, the coated layer is preferably subjected to surface smoothing treatment with, e.g., a super calender roll and the like. The voids generated by the removal of the solvent in drying disappear by the surface smoothing treatment and the packing rate of the ferromagnetic powder in the magnetic layer increases, so that a magnetic recording medium having high electromagnetic characteristics can be obtained. Heat resisting plastic rolls, e.g., epoxy, polyimide, polyamide and polyimide amide are used as the calendering treatment rolls. Metal rolls can also be used in calendering treatment. It is preferred for the magnetic recording medium in the invention to have extremely excellent surface smoothness as high as from 0.1 to 4 nm of central plane average surface roughness at a cut-off value of 0.25 mm, more preferably from 1 to 3 nm. Such high smoothness can be obtained by forming a magnetic layer by using the specific ferromagnetic metal powder and binder as described above, and subjecting the magnetic layer to calendering treatment. As the conditions of calendering treatment, the temperature of calender rolls is from 60 to 100° C., preferably from 70 to 100° C., and particularly preferably from 80 to 100° C., the pressure is from 100 to 500 kg/cm, preferably from 200 to 450 kg/cm, and particularly preferably from 300 to 400 kg/cm.

For reducing a thermal shrinkage factor, there are a method of performing heat treatment in a web state while handling under low tension, and a method of performing heat treatment of a tape as a pile, e.g., in a bulk state or a state of being encased in a cassette (a thermo treatment method), and both methods can be used in the invention. From the point of providing a magnetic recording medium of high output and low noise, a thermo treatment method is preferred.

A magnetic recording medium obtained is cut in a desired size with a cutter for use.

Physical Characteristics

The saturation magnetic flux density of a magnetic layer of a magnetic recording medium for use in the invention is preferably from 100 to 300 T·m (from 1,000 to 3,000 G). The coercive force (Hr) of a magnetic layer is preferably from 143.3 to 318.4 kA/m (from 1,800 to 4,000 Oe), more preferably from 159.2 to 278.6 kA/m (from 2,000 to 3,500 Oe). The coercive force distribution is preferably narrow, and SFD and SFDr is preferably 0.6 or less, more preferably 0.2 or less.

A magnetic recording medium for use in the invention has a friction coefficient against a head of 0.5 or less at temperature of −10 to 40° C. and humidity of 0 to 95%, preferably 0.3 or less, surface intrinsic viscosity of a magnetic surface of preferably from $10^4$ to $10^{12}$ Ω/sq, and a charge potential of preferably from −500 V to +500 V. The elastic modulus at 0.5% elongation of a magnetic layer is preferably from 0.98 to 19.6 GPa (from 100 to 2,000 kg/mm$^2$) in every direction of in-plane, the breaking strength is preferably from 98 to 686 MPa (from 10 to 70 kg/mm$^2$), the elastic modulus of a magnetic recording medium is preferably from 0.98 to 14.7 GPa (from 100 to 1,500 kg/mm$^2$) in every direction of in-plane, the residual elongation is preferably 0.5% or less, and the thermal shrinkage factor at every temperature of 100° C. or less is preferably 1% or less, more preferably 0.5% or less, and most preferably 0.1% or less.

The glass transition temperature of a magnetic layer (the maximum point of the loss elastic modulus by dynamic viscoelasticity measurement at 110 Hz) is preferably from 50 to 180° C., and that of a nonmagnetic layer is preferably from 0 to 180° C. The loss elastic modulus is preferably in the range of from $1\times10^7$ to $8\times10^8$ Pa (from $1\times10^8$ to $8\times10^9$ dyne/cm$^2$), and the loss tangent is preferably 0.2 or less. When loss tangent is too large, adhesion failure is liable to occur. These thermal and mechanical characteristics are preferably almost equal in every direction of in-plane of the medium with the difference of not greater than 10%.

A magnetic layer preferably has a maximum height (SR$_{max}$) of 0.5 μm or less, a ten point average roughness (SRz) of 0.3 μm or less, a central plane peak height (SRp) of 0.3 μm or less, a central plane valley depth (SRv) of 0.3 μm or less, a central plane area factor (SSr) of from 20 to 80%, and an average wavelength (Sλa) of from 5 to 300 μm. These can be easily controlled by the control of the surface property of a support with fillers or by the surface configurations of the rolls of calender treatment. Curling is preferably within ±3 mm.

Between a nonmagnetic layer and a magnetic layer in a magnetic recording medium of the invention, these physical characteristics can be varied according to purposes in a nonmagnetic layer and a magnetic layer. For example, running durability can be improved by making the elastic modulus of the magnetic layer higher and at the same time the head touching of the magnetic recording medium can be improved by making the elastic modulus of the nonmagnetic layer lower than that of the magnetic layer.

EXAMPLES

The invention will be described more specifically with referring to examples. The components, ratios, operations and orders described herein can be changed without departing from the spirit and scope of the invention, and these are not limited to the following examples. In the examples "parts" means "mass parts" unless otherwise indicated.

Example 1

(1) Preparation of Magnetic Layer Coating Solution

| | |
|---|---|
| Ferromagnetic acicular metal powder | 100 parts |
| Composition: Fe/Co/Al/Y = 67/20/8/5 | |
| Surface treating compounds: Al$_2$O$_3$ and Y$_2$O$_3$ | |
| Coercive force (Hc): 183 kA/m | |
| Crystallite size: 12.5 nm | |
| Long axis length: 45 nm | |
| Acicular ratio: 6 | |
| Specific surface area (S$_{BET}$): 45 m$^2$/g | |
| Saturation magnetization (σ$_s$): 140 A · m$^2$/kg (140 emu/g) | |
| Polyurethane resin | 12 parts |
| (branched side chain-containing polyester polyol/diphenylmethane diisocyanate, containing a hydrophilic polar group: —SO$_3$Na = 70 eq/ton) | |
| α-Al$_2$O$_3$ (particle size: 0.06 μm) | 2 parts |
| Carbon black (particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |

(2) Preparation of Nonmagnetic Layer Coating Solution

| | |
|---|---|
| Nonmagnetic inorganic powder | 85 parts |
| α-Iron oxide | |
| Surface treating compounds: Al$_2$O$_3$ and SiO$_2$ | |
| Long axis length: 0.15 μm | |
| Tap density: 0.8 g/ml | |
| Acicular ratio: 7 | |
| Specific surface area (S$_{BET}$): 52 m$^2$/g | |
| pH: 8 | |
| DBP oil absorption amount: 33 g/100 g | |
| Carbon black | 20 parts |
| DBP oil absorption amount: 120 ml/100 g | |
| pH: 8 | |
| Specific surface area (S$_{BET}$): 250 m$^2$/g | |
| Volatile content: 1.5% | |
| Polyurethane resin | 12 parts |
| (branched side chain-containing polyester polyol/diphenylmethane diisocyanate, containing a hydrophilic polar group: —SO$_3$Na = 70 eq/ton) | |
| Acrylic resin | 6 parts |
| (benzyl methacrylate/diacetone acrylamide, containing a hydrophilic polar group, —SO$_3$Na = 60 eq/ton) | |

With each of the magnetic layer coating solution and the nonmagnetic coating solution, components were kneaded in an open kneader, and then dispersed in a sand mill. Six parts of a trifunctional low molecular weight polyisocyanate compound (Coronate 3041, manufactured by Nippon Polyurethane Co., Ltd.) was added to each resulting dispersion, each solution was further blended by stirring for 20 minutes, and then filtered through a filter having an average pore diameter of 1 μm, whereby a magnetic coating solution and a nonmagnetic coating solution were obtained.

(3) Preparation of Back Coat Layer Coating Solution

After kneading substance (i) having the following composition was preliminarily kneaded in a roll mill, kneading substance (ii) having the following composition was added thereto and dispersed with a sand grinder, and 5 parts of polyester resin and 5 parts of polyisocyanate were added to the completed dispersion to prepare a back coat layer coating solution.

Composition of Kneading Substance (i):

| | |
|---|---|
| Carbon black A (particle size: 40 nm) Specific surface area: 45 m$^2$/g DBP oil absorption amount: 65 ml/100 g pH: 9 | 100 parts |
| Nitrocellulose (RS ½, manufactured by Asahi Kasei Corporation) | 50 parts |
| Polyurethane resin glass transition temperature: 50° C. | 40 parts |
| Dispersants | |
| Copper oleate | 5 parts |
| Copper phthalocyanine | 5 parts |
| Precipitating barium sulfate | 5 parts |
| Methyl ethyl ketone | 500 parts |
| Toluene | 500 parts |

Composition of Kneading Substance (ii):

| | |
|---|---|
| Carbon black B (particle size: 270 nm) Specific surface area: 8.5 m$^2$/g DBP oil absorption amount: 36 ml/100 g pH: 10 | 100 parts |
| Nitrocellulose (RS ½, manufactured by Asahi Kasei Corporation) | 40 parts |
| Polyurethane resin | 10 parts |
| Methyl ethyl ketone | 300 parts |
| Toluene | 300 parts |

(4) Manufacture of Magnetic Tape

The above obtained nonmagnetic layer coating solution and then the magnetic layer coating solution were coated by simultaneous multilayer-coating respectively in a dry thickness of 1.5 µm and 0.1 µm on a polyethylene naphthalate (PEN) support (thickness: 6 µm, Young's modulus in the machine direction (MD): 800 kg/mm$^2$, Young's modulus in the transverse direction (TD): 650 kg/mm$^2$, number average molecular weight: 15,000, intrinsic viscosity: 0.50 dl/g, SRa (A): 3.5 nm, and SRa (B): 7.5 nm). The sample was subjected to orientation treatment with a cobalt magnet having a magnetic flux density of 3,000 Gauss and a solenoid having a magnetic flux density of 1,500 Gauss while the magnetic layer was still wet, and then drying, whereby a magnetic layer was formed. Subsequently, the back coat layer coating solution was coated on the other side of the support (opposite to the magnetic layer side) in a dry thickness of 0.5 µm, and the coated layer was dried to form a back coat layer. Thus, a roll of a magnetic recording laminate having provided a magnetic layer on one side and a back coat layer on the other side was obtained.

The laminate was subjected to surface smoothing treatment with a calender of seven stages comprising metal rolls alone at a linear pressure of 300 kg/cm at 90° C., further to heat treatment at 70° C. for 48 hours, and the web was slit to a width of ½ inch to thereby obtain a magnetic tape.

Example 2

A magnetic tape according to the invention was prepared in the same manner as in Example 1 except for changing the number average molecular weight of the nonmagnetic support to 21,000 and the intrinsic viscosity to 0.55 dl/g.

Example 3

A magnetic tape according to the invention was prepared in the same manner as in Example 1 except for changing SRa (A) of the nonmagnetic support to 1.5 nm.

Example 4

A magnetic tape according to the invention was prepared in the same manner as in Example 1 except for changing SRa (A) of the nonmagnetic support to 3.5 nm and SRa (B) to 9.0 nm.

Comparative Example 1

A comparative magnetic tape was prepared in the same manner as in Example 1 except for changing the number average molecular weight of the nonmagnetic support to 10,000 and the intrinsic viscosity to 0.35 dl/g.

Comparative Example 2

A comparative magnetic tape was prepared in the same manner as in Example 1 except for changing the number average molecular weight of the nonmagnetic support to 26,000 and the intrinsic viscosity to 0.65 dl/g.

The physical characteristics of the nonmagnetic support and the difference between concavity and convexity on the cross section of the tape edge were measured according to the following methods.

(1) Measurement of Number Average Molecular Weight

The number average molecular weight was found from the analytical curve formed by dissolving a polyester film in hexafluoroisopropanol (HFIP), with GPC HLC-8220 (constitution of column: comprising two Super HM-M, the temperature of the column bath: 40° C., manufactured by TOSOH CORPORATION), also using HFIP as the eluate, and polymethyl methacrylate (PMMA) whose molecular weight is already known.

(2) Measurement of Intrinsic Viscosity

Intrinsic viscosity was measured by dissolving a polyester film in a mixed solvent comprising phenol/1,1,2,2-tetrachloroethane (60/40 by mass) and with an automatic viscometer mounting Ubbelohde's viscometer at 25° C.

(3) Measurement of Surface Roughness (SRa) by Stylus Type, Three-Dimensional Mean Surface Roughness Meter SRa was measured with a stylus type roughness meter (manufactured by Kosaka Laboratory Ltd.) according to JIS B 0601.

(4) Difference Between Concavity and Convexity on the Cross Section of Tape Edge A tape was cut in the transverse direction with a laser knife, the cross sections of both edges were observed with an electron microscope by 5,000 magnifications, and the difference between the apex of the maximum convexity and the valley of the maximum concavity of the nonmagnetic support was obtained.

The characteristics of each of the obtained magnetic tapes were evaluated as follows. The results obtained are shown in Table 1 below.

(1) Measurement of Running Durability (Edge Shaving)

Recording and reproduction were repeated with LTO drive and the tape was run 1,000 rounds, and dirtying of the guide after running was observed and evaluated according to the following criteria.

◯: Dirtying from the edge of the tape was not observed at all.

Δ: Dirtying from the edge of the tape was generated on the guide flange in the area ratio of ¼ or less.

X: Dirtying from the edge of the tape was generated on the guide flange in the area ratio of ¼ or more.

(2) Measurement of SNR

A recording head (MIG, gap length: 0.15 μm, 1.8 T) and an MR head for reproduction (optimal Br·t: 0.035 T·μm) were attached to LTO drive for modification (these heads were fixed heads). SNR of the reproduction output at linear recording density of 100 kfci and noise (signal factors at the frequency apart from the carrier frequency by 1 MHz) was found with the drive.

TABLE 1

| Example No. | Number Average Molecular Weight of Support | Intrinsic Viscosity of Support (dl/g) | Difference between Concavity and Convexity of Support Edge (μm) | SRa (A) (nm) | SRa (B) (nm) | Running Durability (edge shaving) | SNR (dB) |
|---|---|---|---|---|---|---|---|
| Example 1 | 15,000 | 0.5 | 0.7 | 3.5 | 7.5 | ◯ | 5.5 |
| Example 2 | 21,000 | 0.55 | 1.5 | 3.5 | 7.5 | ◯ | 5.5 |
| Example 3 | 15,000 | 0.5 | 0.7 | 1.5 | 7.5 | ◯ | 7 |
| Example 4 | 15,000 | 0.5 | 0.7 | 3.5 | 9.0 | ◯ | 4.0 |
| Comparative Example 1 | 10,000 | 0.35 | 0.2 | 3.5 | 7.5 | Δ | 5.5 |
| Comparative Example 2 | 26,000 | 0.65 | 2.5 | 3.5 | 7.5 | x | 5.5 |

As shown in Table 1, since the average molecular weight and intrinsic viscosity of the nonmagnetic support are too small in the magnetic tape in Comparative Example 1, the strength of the tape itself is insufficient and the damage of edge by running is great, although the difference between concavity and convexity of the tape edge is small. In Comparative Example 2, in contrast with this, the average molecular weight and intrinsic viscosity of the nonmagnetic support are too great, slitting of the tape is difficult, and the difference between concavity and convexity of the tape edge becomes great, so that edge shavings by running increase.

On the other hand, the magnetic tapes in Examples 1 to 4 were hardly accompanied by the edge shavings by durable running and exhibit excellent electromagnetic characteristics (high SNR).

Further, from Example 3, it can be seen that SNR is improved by lessening SRa (A) of a nonmagnetic support. It is thought due to the fact that the spacing loss between a tape and a head becomes small. From Example 4, it can be seen that SNR is liable to lower when SRa (B) of a nonmagnetic support increases. This is presumably because a backing layer roughens when SRa (B) becomes larger and a magnetic layer is depressed by the impression, so that SNR deteriorates.

This application is based on Japanese Patent application JP 2004-28926, filed Feb. 5, 2004, the entire content of which is hereby incorporated by reference, the same as if set forth at length.

What is claimed is:

1. A magnetic recording tape comprising a nonmagnetic support and a magnetic layer containing ferromagnetic powder and a binder, wherein the nonmagnetic support has an intrinsic viscosity of from 0.40 to 0.60 dl/g and a number average molecular weight of from 12,000 to 24,000, and a distance between an apex of a maximum convexity and a valley of a maximum concavity of the nonmagnetic support on a cross section of an edge of the tape made by cutting the tape in a transverse direction is 2 μm or less in the transverse direction.

2. The magnetic recording tape according to claim 1, wherein: the nonmagnetic support is a polyester film comprising at least two layers; and a stylus type, three-dimensional mean surface roughness of a surface of the nonmagnetic support on a side having the magnetic layer, SRa (A) is from 1 to 6 nm, a stylus type, three-dimensional mean surface roughness of a surface of the nonmagnetic support on a side opposite to the side having the magnetic layer, SRa (B) is from 6 to 10 nm, and the SRa (A) is smaller than the SRa (B).

3. The magnetic recording tape according to claim 1, further comprising a nonmagnetic layer containing nonmagnetic powder and a binder, between the nonmagnetic support and the magnetic layer.

4. The magnetic recording tape according to claim 1, further comprising a back coat layer containing a carbon black and inorganic powder, so that the back coat layer, the nonmagnetic support and the magnetic layer are in this order.

5. The magnetic recording tape according to claim 4, wherein the back coat layer contains a carbon black having an average particle size of from 10 to 60 nm and a carbon black having an average particle size of from 100 to 270 nm.

6. The magnetic recording tape according to claim 1, wherein the nonmagnetic support has an intrinsic viscosity of from 0.45 to 0.55 dl/g.

7. The magnetic recording tape according to claim 1, wherein the nonmagnetic support has a number average molecular weight of from 14,000 to 20,000.

8. The magnetic recording tape according to claim 1, wherein the nonmagnetic support has a number average molecular weight of from 14,000 to 16,000.

9. The magnetic recording tape according to claim 1, wherein the distance is 1.5 μm or less.

10. The magnetic recording tape according to claim 1, wherein the distance is 1.0 μm or less.

11. The magnetic recording tape according to claim 1, wherein the nonmagnetic support has a thickness of from 2 to 80 μm.

12. The magnetic recording tape according to claim 1, wherein the magnetic layer has a thickness of 0.2 μm or less.

13. The magnetic recording tape according to claim 1, wherein the magnetic layer has a thickness of from 0.02 to 0.15 μm.

14. The magnetic recording tape according to claim 3, wherein the nonmagnetic layer has a thickness of from 0.2 to 5.0 μm.

15. The magnetic recording tape according to claim 4, wherein the back coat layer has a thickness of from 0.1 to 4 μm.

* * * * *